United States Patent
Sassoon

(10) Patent No.: US 10,647,244 B2
(45) Date of Patent: May 12, 2020

(54) LED HEADLAMP WITH DAYTIME RUNNING LAMP

(71) Applicant: Charles I. Sassoon, Hauppauge, NY (US)

(72) Inventor: Charles I. Sassoon, Hauppauge, NY (US)

(*) Notice: Subject to any disclaimer, the term of this patent is extended or adjusted under 35 U.S.C. 154(b) by 0 days.

(21) Appl. No.: 16/292,512

(22) Filed: Mar. 5, 2019

(65) Prior Publication Data
US 2019/0381932 A1 Dec. 19, 2019

Related U.S. Application Data

(63) Continuation of application No. 16/133,017, filed on Sep. 17, 2018, now Pat. No. 10,220,763, which is a continuation of application No. 14/974,341, filed on Dec. 18, 2015, now Pat. No. 10,076,992.

(51) Int. Cl.
| | |
|---|---|
| *B60Q 1/00* | (2006.01) |
| *B60Q 1/14* | (2006.01) |
| *F21S 41/19* | (2018.01) |
| *F21S 41/143* | (2018.01) |
| *B60Q 1/04* | (2006.01) |

(Continued)

(52) U.S. Cl.
CPC ......... *B60Q 1/0088* (2013.01); *B60Q 1/0058* (2013.01); *B60Q 1/04* (2013.01); *B60Q 1/14* (2013.01); *B60Q 1/1415* (2013.01); *F21S 41/143* (2018.01); *F21S 41/192* (2018.01); *B60Q 2400/30* (2013.01); *F21S 41/18* (2018.01); *F21Y 2115/10* (2016.08)

(58) Field of Classification Search
CPC .......... B60Q 1/0088; B60Q 1/14; B60Q 1/04; B60Q 1/1415; B60Q 2400/30; F21S 41/143; F21S 41/192
See application file for complete search history.

(56) References Cited

U.S. PATENT DOCUMENTS

| | | | |
|---|---|---|---|
| 6,109,772 | A | 8/2000 | Futami et al. |
| 6,118,371 | A | 9/2000 | Haddad et al. |

(Continued)

FOREIGN PATENT DOCUMENTS

| | | |
|---|---|---|
| DE | 10147289 A1 | 4/2003 |
| DE | 10 2010 023583 A1 | 12/2011 |

(Continued)

OTHER PUBLICATIONS

Extended European Search Report dated Jun. 27, 2017 in European Patent Application No. 16205011.6.

*Primary Examiner* — Evan P Dzierzynski
(74) *Attorney, Agent, or Firm* — Stroock & Stroock & Lavan LLP

(57) ABSTRACT

Improved light emitting diode (LED) vehicle headlamps having a dedicated daytime running lamp (DRL) component are described. In various embodiments, a combination Low Beam/DRL headlamp is provided, which uses pulse width modulation (PWM) detection to determine which of the two internal LED light sources (Low Beam or DRL) is powered on. If the Low Beam/DRL headlamp detects a PWM signal on the Low Beam voltage input then it switches to drive the DRL LEDs. If, alternatively, it detects a steady state input voltage then it switches to drive the Low Beam LEDs.

12 Claims, 11 Drawing Sheets

(51) Int. Cl.
   *F21Y 115/10*   (2016.01)
   *F21S 41/14*   (2018.01)

(56) References Cited

U.S. PATENT DOCUMENTS

| | | | |
|---|---|---|---|
| 7,400,058 B1 * | 7/2008 | Wayne | B60Q 1/143 |
| | | | 307/9.1 |
| 2002/0171291 A1 | 11/2002 | Wayne et al. | |
| 2009/0001888 A1 * | 1/2009 | Asada | B60Q 1/1415 |
| | | | 315/83 |
| 2011/0169409 A1 | 7/2011 | Stasky et al. | |
| 2014/0104860 A1 | 4/2014 | Chou | |
| 2014/0111087 A1 | 4/2014 | Kurebayashi | |
| 2014/0361685 A1 * | 12/2014 | Yamamichi | H05B 33/0803 |
| | | | 315/53 |
| 2015/0323147 A1 | 11/2015 | Kanayama et al. | |

FOREIGN PATENT DOCUMENTS

| | | |
|---|---|---|
| DE | 10 2011 082396 A1 | 3/2013 |
| DE | 10 2014 002597 A1 | 8/2015 |
| EP | 0911575 A1 | 4/1999 |
| EP | 2722226 A1 | 4/2014 |
| JP | 2004/051080 A | 2/2004 |
| WO | 2005/05194 A1 | 1/2005 |

* cited by examiner

LED HEADLAMP WITH DAYTIME RUNNING LAMP

RELATED APPLICATIONS

This application is a continuation of U.S. application Ser. No. 16/133,017, filed Sep. 17, 2018, now U.S. Pat. No. 10,220,763, which is a continuation of U.S. application Ser. No. 14/974,341, filed Dec. 18, 2015, now U.S. Pat. No. 10,076,992, the contents of each of which are incorporated by reference herein in their entirety.

BACKGROUND

A daytime running lamp (DRL, also referred to as a daytime running light) is a lighting device mounted on the front of a vehicle (automobiles and trucks), which typically emits white light. DRLs are intended for daytime use, to increase the visibility of the vehicle in daylight. Mandated in many countries, including Canada, DRLs automatically switch on when the engine is running (e.g., when the ignition key is turned, or optionally when the vehicle is moving forward or the forward gear is engaged), and turn off when the parking lights or headlights are switched on.

Depending on prevailing regulations and vehicle equipment, the daytime running light function may be implemented by functionally specific lamps, by operating the low beam headlamps or fog lamps at full or reduced intensity, by operating the high beam headlamps at reduced intensity, or by steady-burning operation of the front turn signals at full or increased intensity (en.wikipedia.org/wiki/Daytime_running_lamp).

Various studies have shown that daytime running lights reduce daytime accidents by making vehicles more conspicuous to other road users (e.g., to drivers of other vehicles and particularly to more vulnerable road users such as pedestrians, bicyclists, and motorcyclists). The greatest benefits are found with the more severe accidents, such as head-on and intersection crashes and collisions with pedestrians and cyclists (members.optusnet.com.au/carsafety/paine_drl_nrma_racv.pdf). However, various disadvantages have been identified, including waste of energy (increased fuel consumption), glare from wet roads, and increased frequency of lamp failure (e.g., when an existing low beam, high beam, or turn signal lamp is used for the DRL function and is run down faster due to the additional usage).

Improved DRLs, which can increase the performance and effectiveness of these devices as well as the safety benefits thereof, are needed.

SUMMARY

The present invention provides, in various embodiments, an improved light emitting diode (LED) vehicle headlamp having a dedicated daytime running lamp (DRL) component. In some embodiments, the invention provides a combination Low Beam/DRL headlamp.

In some embodiments, the Low Beam/DRL headlamp uses pulse width modulation (PWM) detection to determine which of the two internal LED light sources (Low Beam or DRL) is powered on. If the Low Beam/DRL headlamp detects a PWM signal on the Low Beam voltage input then it switches to drive the DRL LEDs. If, alternatively, it detects a steady state input voltage then it switches to drive the Low Beam LEDs.

In some embodiments, the Low Beam/DRL headlamp requires no direct connection to the battery; rather, it operates off the Low Beam voltage input. It uses the Low Beam voltage input to determine if it is a dynamic input voltage (driving a DRL mode of operation) or a steady state input voltage (driving a Low Beam mode of operation), while additionally using that voltage input to power the Low Beam or DRL Beam LEDs embodied in the headlamp.

In some embodiments, the Low Beam/DRL headlamp makes no attempt to determine if it is entering into a start-up condition; rather, it continually analyzes the input voltage for the Low Beam input (steady state) or DRL input (dynamic) and drives the appropriate beam based on that input.

In some embodiments, the invention provides a daytime running lamp (DRL) component for a vehicle headlamp comprising: a support; at least one first LED mounted to the front of the support, said at least one first LED configured and arranged to output daytime running light under daylight conditions when the vehicle's engine is turned on; a clear lens mounted above the at least one first LED; at least one second LED mounted to the back of the support, said at least one second LED configured and arranged to output low beam head light when the low beam is turned on by the vehicle operator via a first vehicle switch; a three-contact power connector comprising a low beam contact, a high beam contact, and a ground; and a control circuit for operating the DRL component, said control circuit comprising a pulse width modulation (PWM) detection circuit configured to continuously monitor input voltage, to activate the at least one first LED when a PWM signal is detected on the low beam contact, and to activate the at least one second LED when a steady state voltage is detected on the low beam contact or the high beam contact.

In some embodiments, the invention provides a dual beam headlamp, comprising a DRL component as described above mounted inside a headlamp chamber having a reflective inner back wall.

In some embodiments, the invention provides a four lamp head light system, comprising two dual beam headlamps as described above, and two high beam lamps.

In some embodiments, the invention provides a triple beam headlamp, comprising a DRL component as described above mounted inside a headlamp chamber having a reflective inner back wall and at least one third LED configured and arranged to output high beam head light when the high beam is turned on by the vehicle operator via a second vehicle switch.

In some embodiments, the invention provides a two lamp headlight system, comprising two triple beam headlamps as described above.

In some embodiments, dual beam or triple beam headlamp(s) as described above are configured to be mounted to a commercial truck, a motorcycle, and/or a recreational vehicle (RV).

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of the preferred embodiments of the invention, will be better understood when read in conjunction with the appended drawings. For the purposes of illustrating the lighting devices of the present application, there are shown in the drawings preferred embodiments. It should be understood, however, that the application is not limited to the precise arrangements and instrumentalities shown. In the drawings.

DETAILED DESCRIPTION

Certain localities require certain vehicles to have daytime running lights. In some systems, halogen-type low beam headlamps are used to produce a dimmer low beam light output that meets the DRL requirements. However, such systems have various disadvantages, including increased fuel consumption and increased lamp failure.

In various preferred embodiments of the invention, a lighting device is provided having one or more light emitting diodes (LEDs) that are configured to be used specifically for DRL functionality, rather than operating an existing halogen lamp at reduced intensity to meet the designated DRL function as described above. Without wishing to be bound by theory, it is believed that isolating the DRL function specifically within the headlamp chamber increases the functionality of the DRL, furnishes stronger noticeability of illumination by its directionality, and hence augments safety during daytime driving.

Figure 1A:
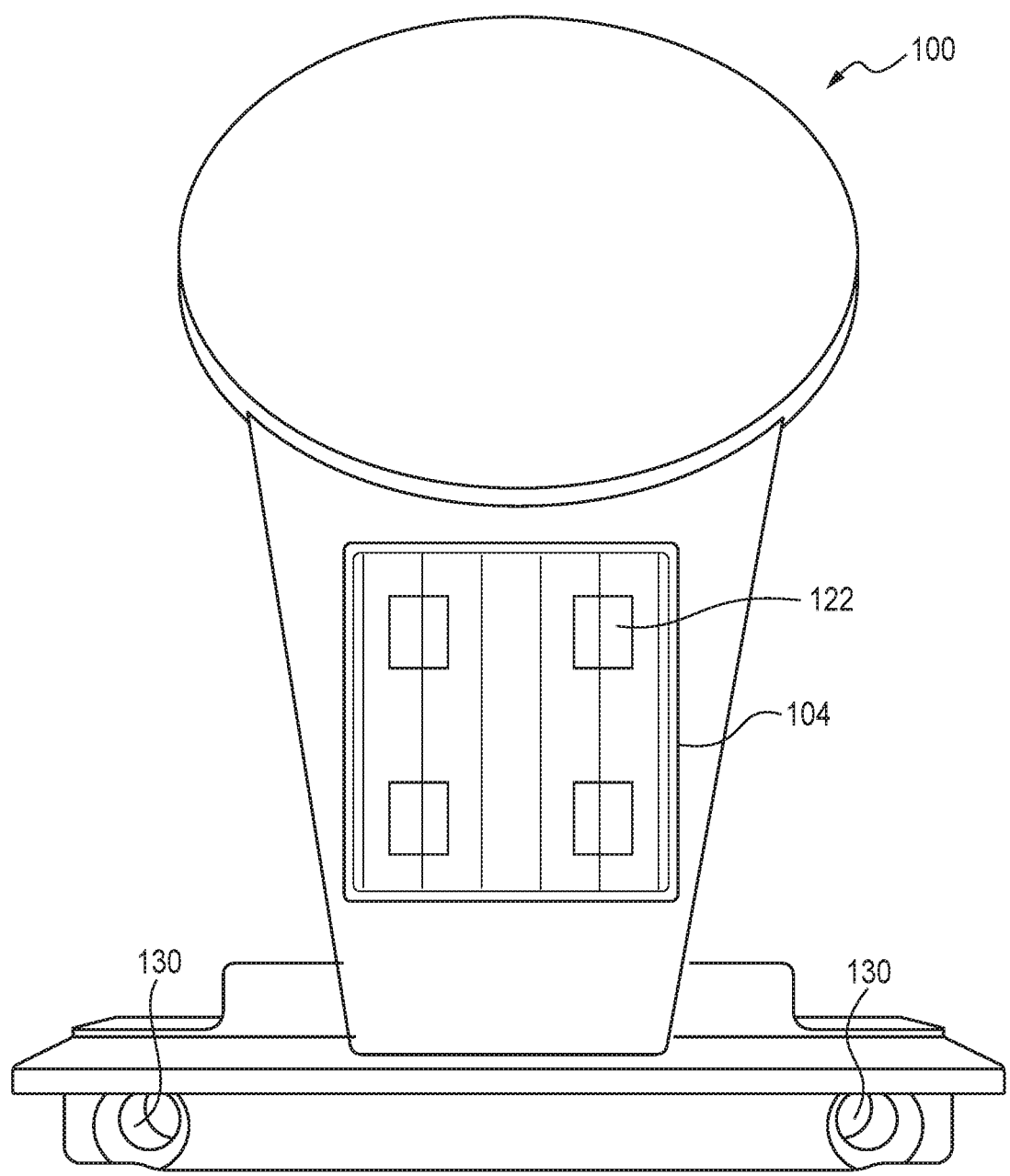
FIG. 1A shows a close-up front view of a DRL of the present invention, according to some embodiments.
Figure 1B:
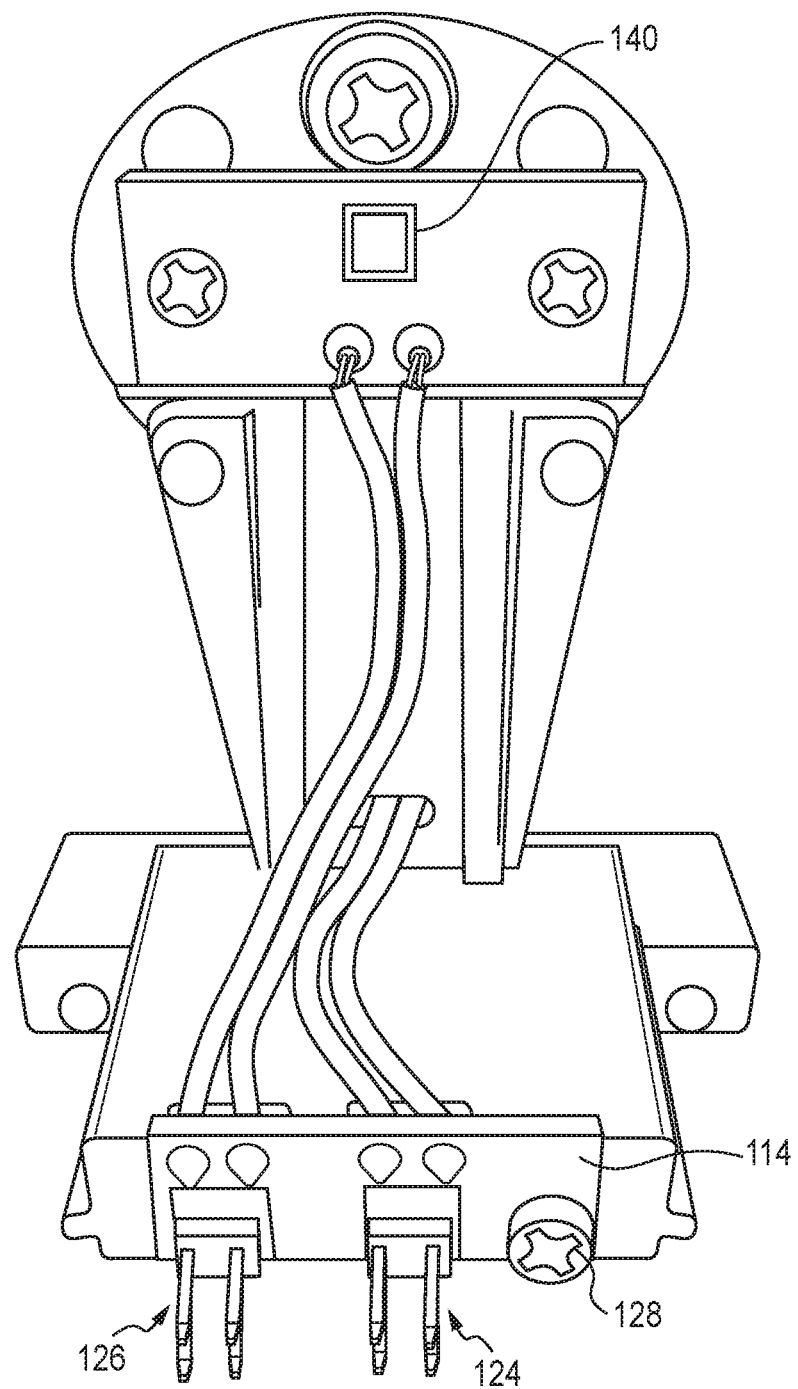
FIGS. 1B-C show back and side views of the DRL of FIG. 1A, respectively.
Figure 1C:
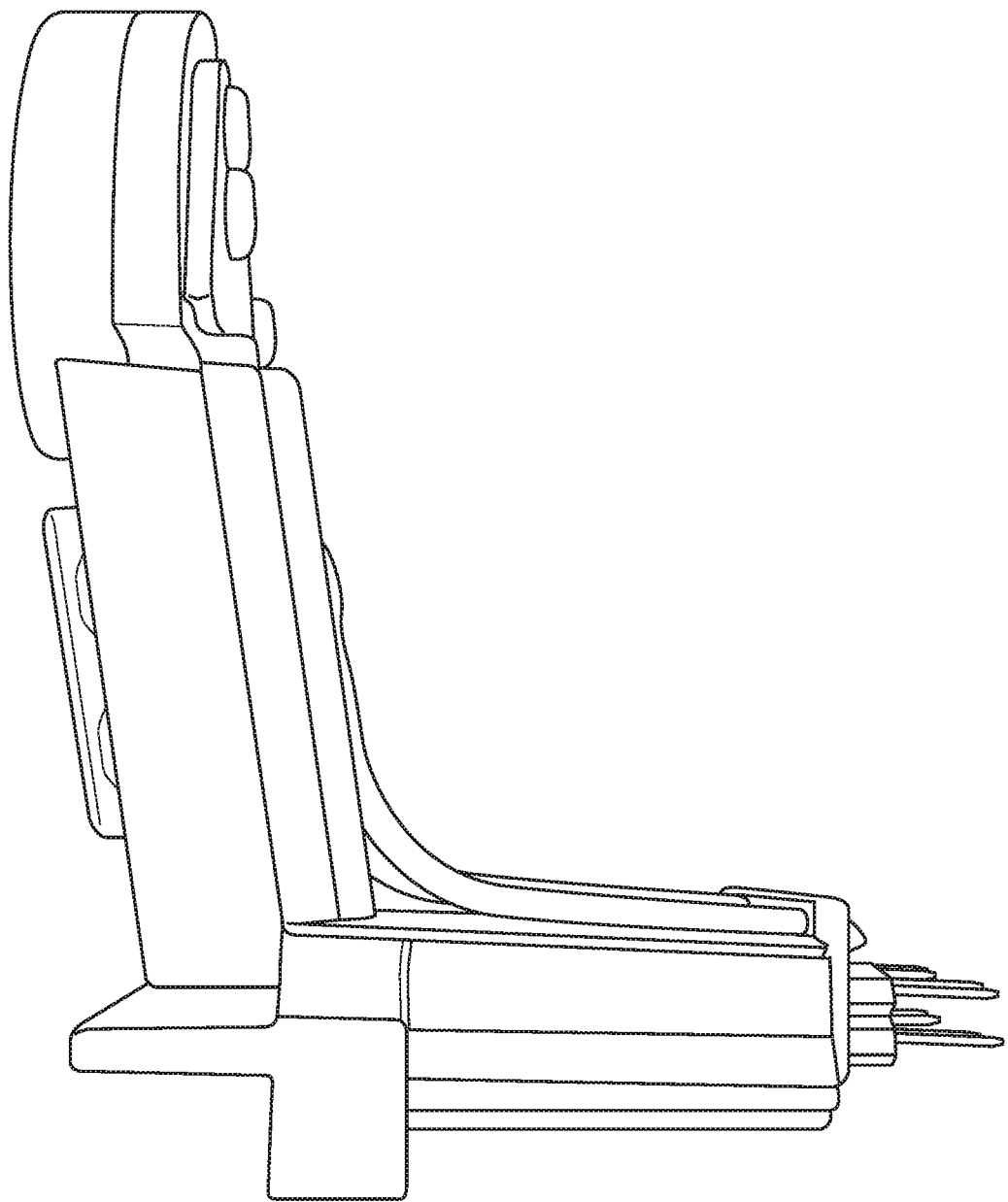

FIG. 1A shows a close-up front view of a DRL component 100 of the present invention, according to some embodiments. Four DRL LEDs 122 are positioned behind a textured clear lens 104. The DRL component includes two holes 130 to facilitate screw mounting inside a headlamp chamber. FIGS. 1B-C show back and side views of the DRL component of FIG. 1A, respectively. As shown in FIG. 1B, one or more low beam LEDs, such as low beam LED 140, can be included on the back of the DRL component. Power connectors for DRL LEDs 122 and low beam LED 140, such as the four-pin connectors shown at 124 and 126 respectively, can be mounted to a connector support 114 and secured by screw 128. As shown in FIG. 1C, in some embodiments, the main body of the DRL component is configured in an L shape comprising an obtuse angle, so that when the DRL component is mounted inside the headlamp chamber and activated the DRL beam emitted therefrom is directed in a downward-sloping direction.

Figure 2:
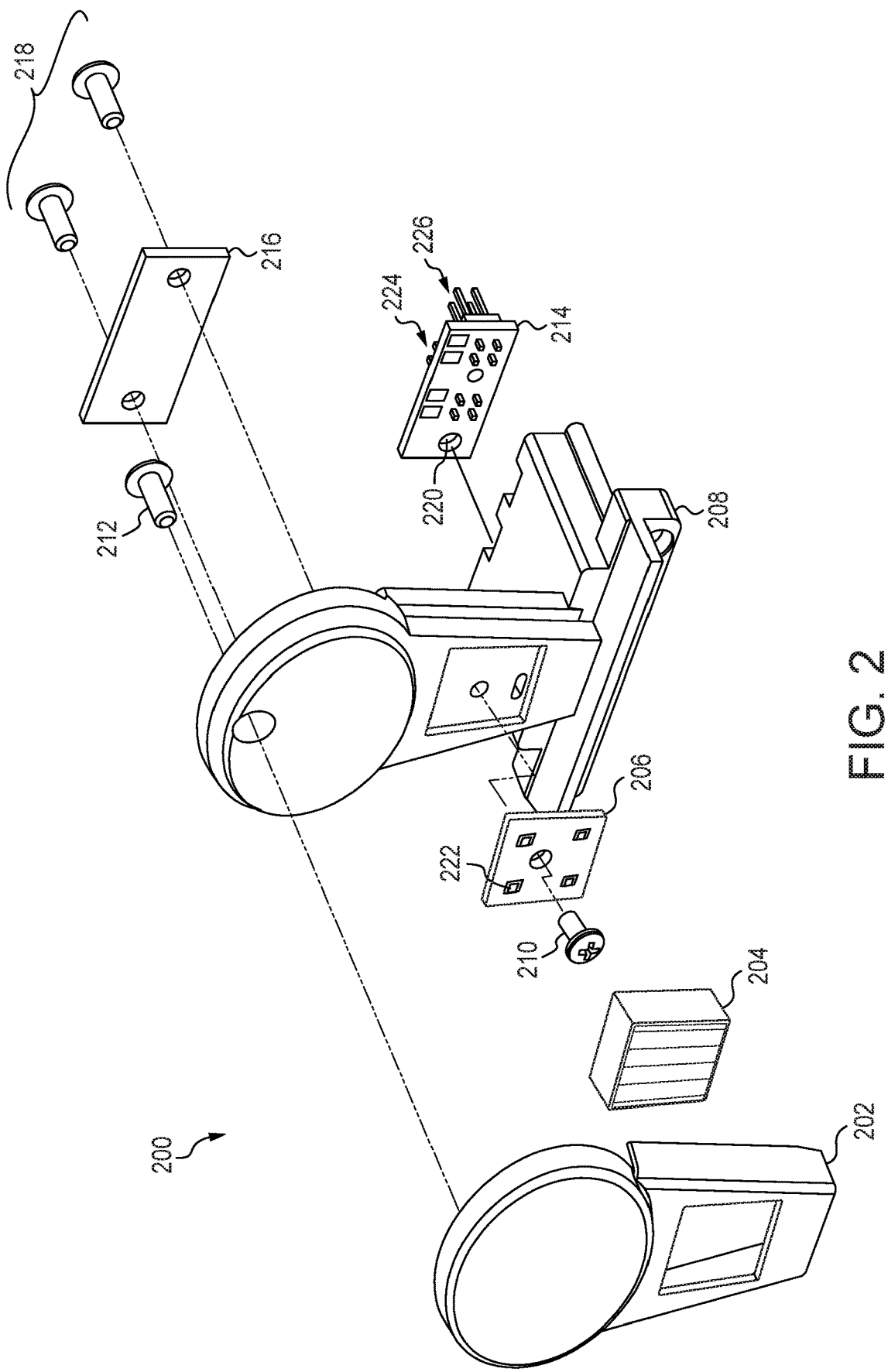
FIG. 2 is an exemplary diagram showing how the components of the DRL are assembled, according to some embodiments.

FIG. 2 is an exemplary diagram showing how the components of DRL component 200 are assembled, according to some embodiments. On the front face, four LEDs 222 on support 206 are mounted to central support 208 via screw 210 and covered by a textured clear lens 204. Faceplate 202 is fitted thereto and secured to central support 208 via screw 212. On the back face, PCB 216 is secured to central support 208 via screws 218, and connector support 214, with power connectors 224 and 226, is secured to central support 208 by a screw (shown in FIG. 1B at numeral 128) fitted through hole 220. Central support 208 comprises a light, strong, and/or economical material, such as, but not limited to, aluminum.

In certain preferred embodiments, textured lens 204 comprises an array of raised rounded ridges aligned lengthwise on the outer surface of lens 204. In other embodiments, other texture patterns may be used, on the outer and/or inner surface of the lens. Textured lens 204 can comprise any shape. In some embodiments, the shape and/or texture pattern of lens 204 may be selected, for example, according the number, arrangement, and/or type of DRL LEDs as described below, and/or other criteria.

Figure 3A:
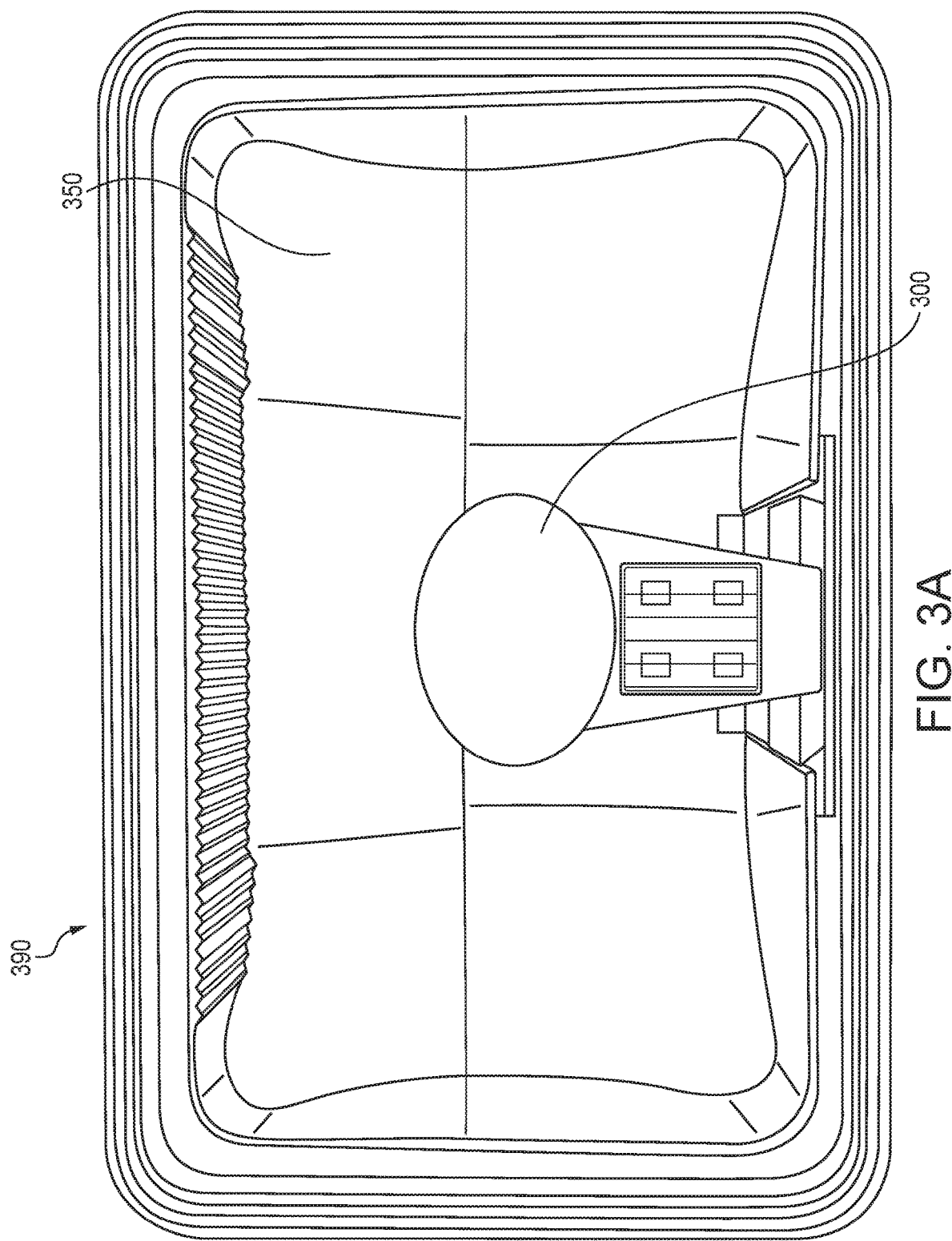
FIG. 3A shows a front view of a combination Low Beam/DRL headlamp of the present invention, according to some embodiments.
Figure 3B:
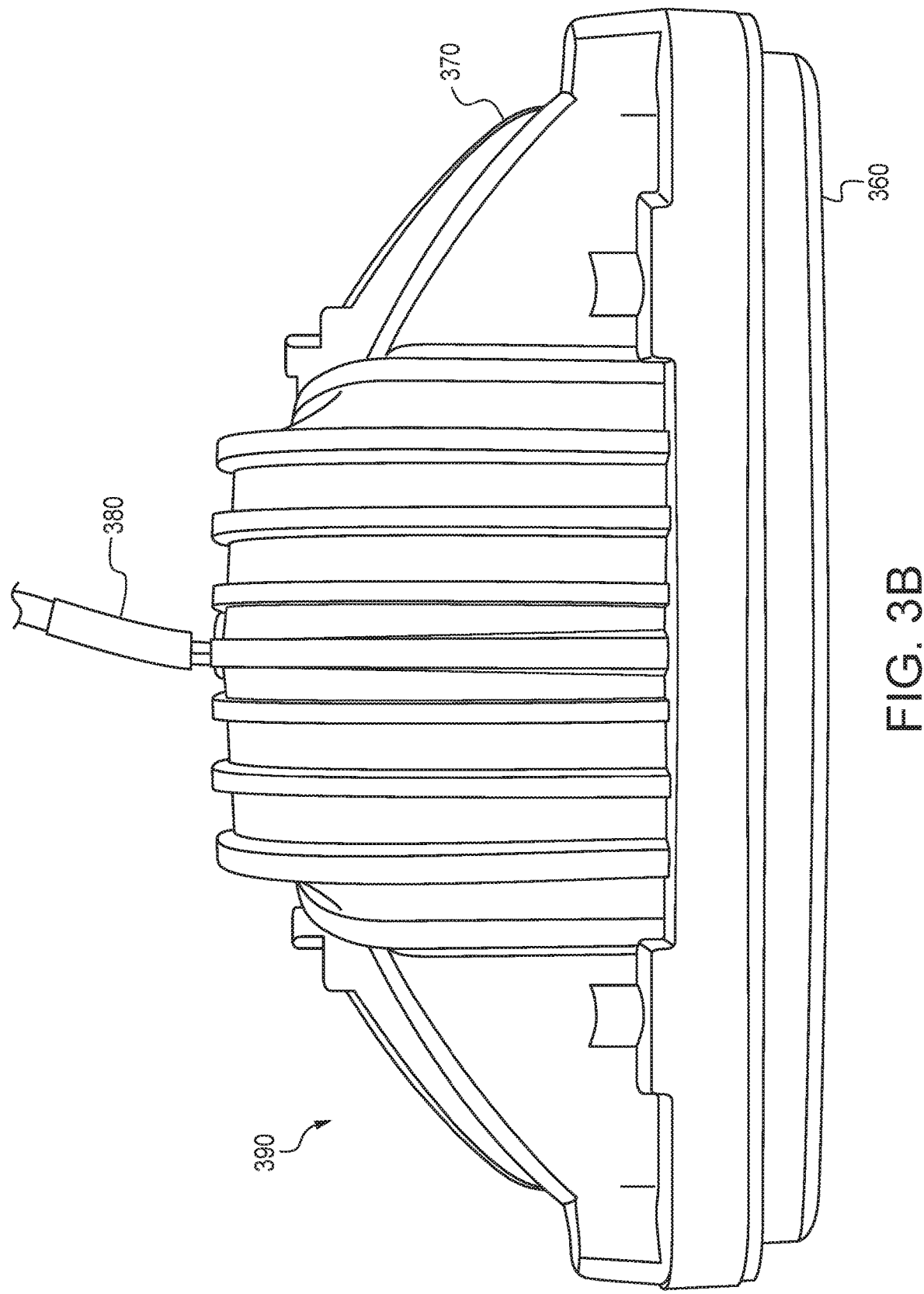
FIG. 3B shows a top view of the device of FIG. 3A.

In some embodiments, the DRL component is part of a dual beam headlamp that provides both a DRL function and a low beam headlamp function. FIG. 3A shows a front view of a Low Beam/DRL headlamp device 390 of the present invention, according to some embodiments, with DRL component 300 isolated within headlamp chamber 350, which preferably has a multi-faceted, reflective inner back wall as shown. The device comprises a 4"×6" rectangular integrated dual beam head light. In various embodiments, the device includes one or more of the following features: Five (5) LEDs, Auto Select 12/24 VDC Dual Voltage, Polycarbonate Lens with Hard Coating Shell, Standard 3 Blade OEM Connector. FIG. 3B shows a top view of the device of FIG. 3A, showing headlamp lens 360 and headlamp outer shell 370, as well as power cord 380. Shell 370 comprises a light, strong, and/or economical material, such as, but not limited to, aluminum. Dimensions of the device shown are approximately 6.6"×4.2"×3.6". In some embodiments, the Low Beam LEDs comprise one LUXEON® MZ (an undomed multi-die LED, www.lumileds.com/uploads/447/DS136-pdf, as shown, e.g., at FIG. 1B numeral 140) and the DRL LEDs comprise four LUXEON® Z LEDs. The Low Beam LEDs are selected and configured to output a light pattern to meet U.S. Department of Transportation Low Beam Requirements and the DRL LEDs are selected and configured to output a light pattern to meet U.S. Department of Transportation DRL Requirements. Different numbers, arrangements, and types of LEDs may be used for each lighting function, which also meet these requirements. For example, in some embodiments, the DRL LEDs can comprise one LUXEON® MZ LED.

In some embodiments, Low Beam/DRL headlamp 390 is part of a four lamp system comprising two Low Beam/DRL headlamps and two High Beam headlamps. In some embodiments, the Low Beam/DRL headlamps have power connectors comprising three contacts, a Low Beam contact, a High Beam contact, and a Ground. In some embodiments, the three contacts comprise three pins/blades. In some embodiments, each Low Beam/DRL headlamp has a three-pin connector having a Low Beam pin, a High Beam pin, and a Ground. If a PWM Signal is input on the Low Beam pin then the DRL Beam is energized within the headlamp. If either the Low Beam pin or the High Beam pin have a steady state voltage then the Low Beam is energized within the headlamp.

When started, vehicles equipped with the four lamp system described above output a PWM signal to the two Low Beam/DRL headlamps' Low Beam pins. When the vehicle operator switches on the Low Beam via a first vehicle switch then the vehicle applies a steady state voltage to the two Low Beam/DRL headlamps' Low Beam pins. When the vehicle operator switches on the High Beam via a second vehicle switch then the vehicle applies a steady state voltage to the two Low Beam/DRL headlamps' High Beam pins. Additionally, when the vehicle operator switches to High Beam the two High Beam headlamps are also energized with a steady state voltage.

Figure 4:
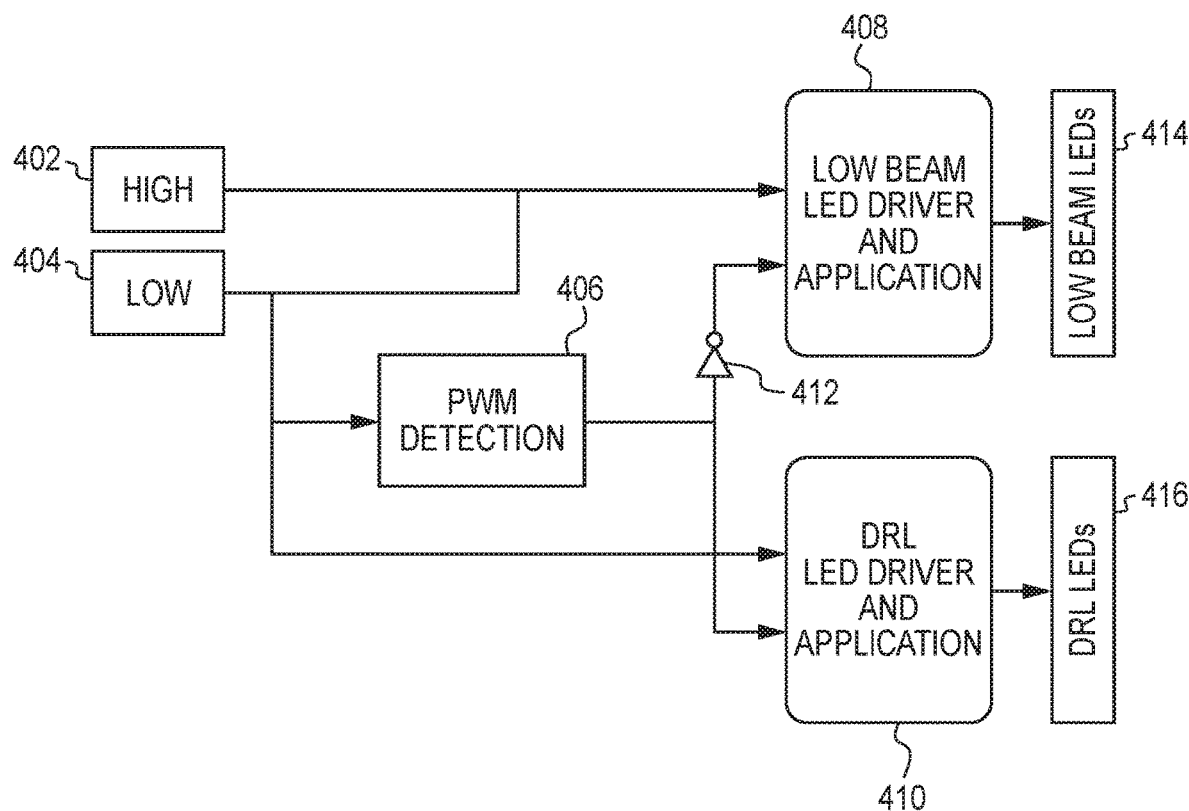
FIG. 4 shows a block diagram of an exemplary control circuit, according to some embodiments.

FIG. 4 shows a block diagram of the Low Beam/DRL headlamp circuit according to some embodiments, including High Beam contact 402, Low Beam contact 404, PWM Detection circuit 406, DRL LED Driver and Application circuit 410, DRL LEDs 416, NOT gate 412, Low Beam LED Driver and Application circuit 408, and Low Beam LEDs 414.

PWM Detection and Switching Overview:

This circuit either detects a steady state voltage to control the Low Beam LEDs or a PWM input to drive the DRL LEDs. The DRL Detection takes advantage of the PWM signal comprising many AC signals at different frequencies and amplitudes added together to form the PWM Square Wave signal DRL Voltage input. This results in an immediate detection of the rising edge of the PWM DRL Voltage input.

Figure 5A:
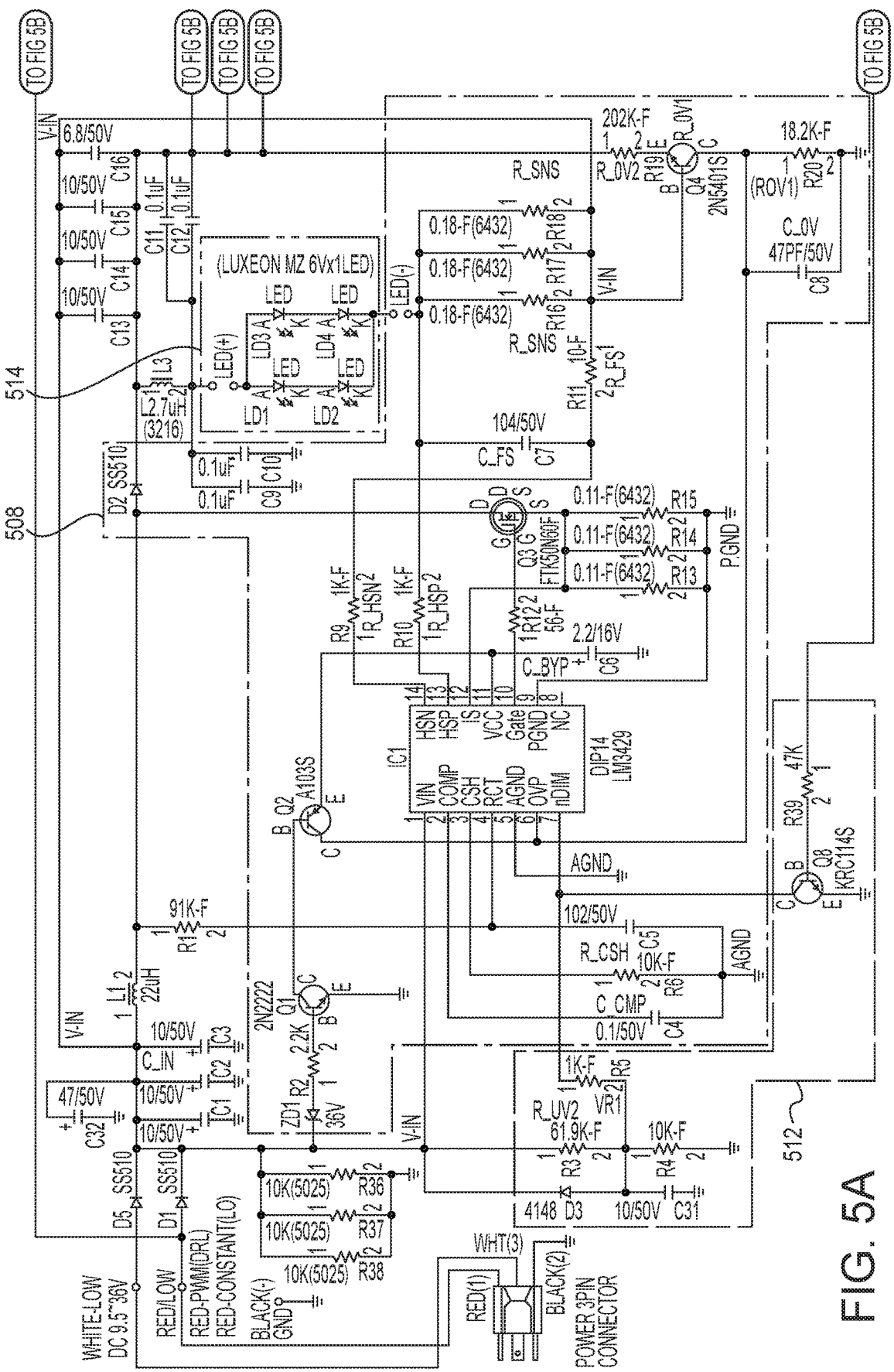
FIGS. 5A and 5B show a schematic diagram of the Low Beam/DRL headlamp circuit, according to some embodiments.
Figure 5B:
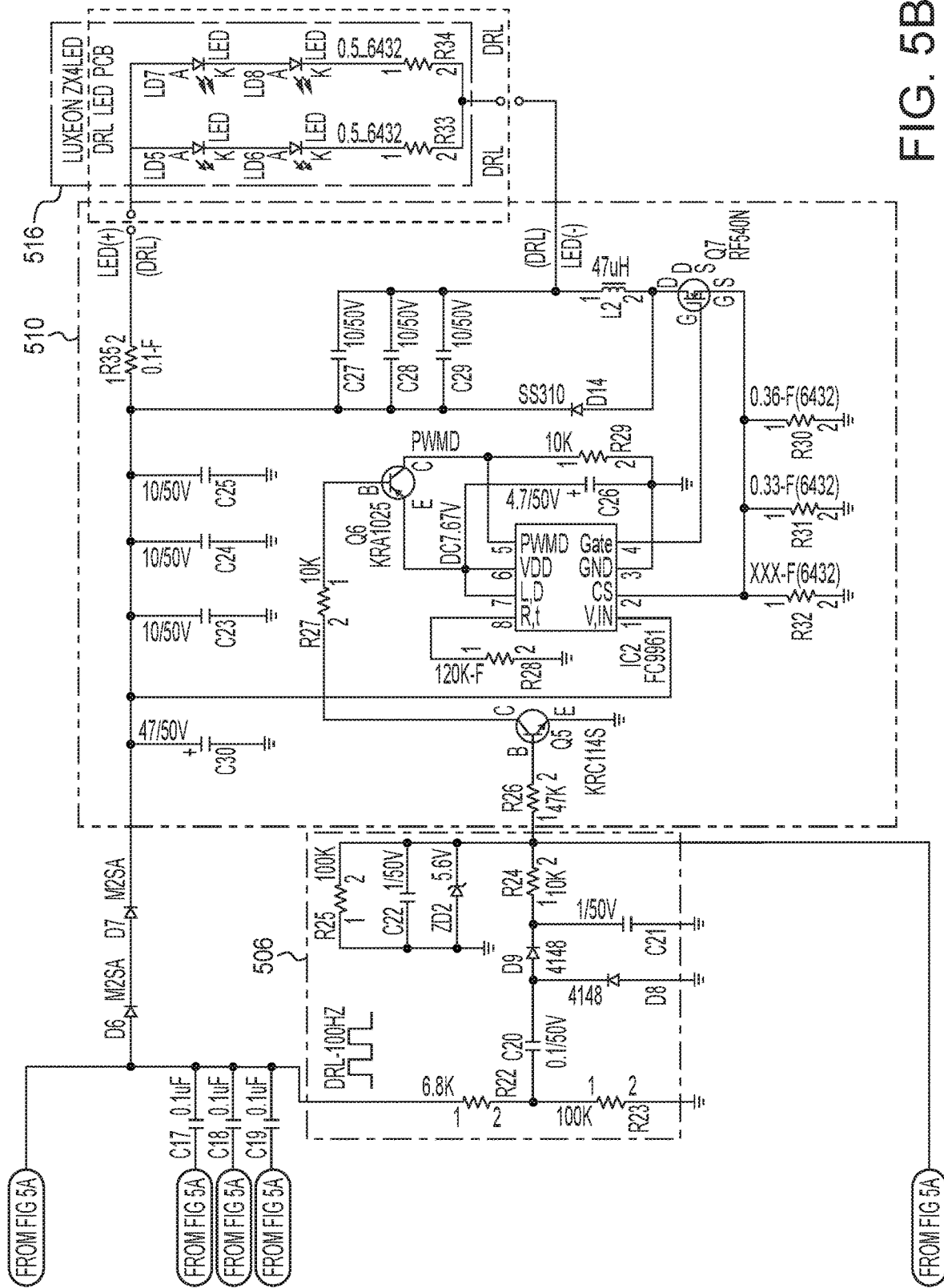

FIGS. 5A and 5B show a schematic diagram of the Low Beam/DRL headlamp circuit, according to some embodiments, with circuit blocks indicated, including PWM Detection circuit 506, Switching 512, Low Beam LED Driver and Application circuit 508, Low Beam LED 514, DRL LED Driver and Application circuit 510, and DRL Beam LEDs 516. PWM Detection and Switching of the Low Beam/DRL headlamp is described in further detail below, with reference to FIGS. 5A and 5B.

DC Input Voltage:

R22 and R23 form a voltage divider that outputs 93.6% of the Low Beam Input Voltage to the AC Coupling Capacitor C20. C20 operates as an AC Coupling Capacitor that blocks DC Voltage. Once the DC Voltage is blocked, the capacitors C21 and C22, if charged, will be discharged by R24 and R25 and the transistors base resistors R26 and R39. A full discharge of these capacitors will occur in 0.1 seconds or less. Thus, the maximum delay from the time a vehicle driver switches the DRL to Low Beam switch to the time of the actual switch over is less than one tenth of a second. With zero current from the base to emitter at the Bipolar Junction Transistor Q5, it will open the circuit from the resistor R27 to ground. Consequently, with no current flowing from R27 to ground, the PNP transistor Q6 will open the connection from the internal power supply voltage VDD to the PWM Dimming Pin of IC2. A grounded PWM pin of IC2 represents a duty cycle of 0% making the LED Driver IC2 dim the output to 0% or off. Additionally, the cease of current at the resistor R39 causes Q8 to turn off to allow the V-IN input Voltage to be divided by R3 and R4 to then cause a constant Voltage to the LED Driver IC1 Dimming input which is equivalent to 100% Duty Cycle which causes full brightness output to the Low Beam LEDs.

PWM Input Voltage:

R22 and R23 form a voltage divider that outputs 93.6% of the Low Beam Input Voltage to the AC Coupling Capacitor C20. C20 operates as an AC Coupling Capacitor that passes the PWM Voltage signal while removing any DC offset. Additionally, the capacitor C20 together with the diode D8 work together to create a DC bias shift on the output. During the negative part of the cycle the diode D8 will conduct and charge the capacitor C2. During the positive part of the cycle the diode D8 is reversed biased and the output is therefore V(C20)+Vin. At high frequency, the DC offset V(C20) is approximately Vin minus the forward bias Voltage of diode D8. Diode D9 works in conjunction with diode D8 by eliminating any negative value caused by the forward bias Voltage of diode D8. Additionally, C20 functions with R24 and R25 to form an RC High Pass Filter.

Using the RC High Pass Filter Equation f(cut-off) puts the cutoff frequency to be 14 Hz for the example shown. With the voltage rectification caused by capacitors C21, C22 and the Zener diode ZD2, this results in a positive DC Voltage equal to the ZD2 Zener diode clamping voltage of 5.6 V in the example regardless of the 9.5 to 36 Volt range at the input. This voltage meets required Emitter-Base Voltage V(EBO) of the bipolar junction transistors Q5 and Q8. Current flowing at the base of the NPN Transistor Q5 will turn it on. This grounds the PNP transistor Q6 base to meet the required Emitter Base Voltage V(EBO) of the PNP transistor Q6 which cause the emitter input of the PNP transistor Q6 to be conducted to the collector of the PNP transistor Q6 to connect the LED Driver IC2 reference Voltage output to the PWM Dimming pin of the LED Driver IC2. The constant Voltage to the LED Driver IC2 PWM Dimming input is equivalent to a 100% duty cycle which causes a full brightness output to the DRL LEDs.

Below 100 Hz PWM input the RC High Pass Filter attenuates the signal which propagates through the rest of the circuit. Below the 14-Hz Cutoff Frequency a sharp attenuation occurs reducing the rectified Voltage to near zero Volts which shuts off the DRL Beam and turns on the Low Beam of the Low Beam/DRL headlamp.

For frequencies above the 14-Hz Stop Band, the circuit operates as follows. C20 changes the offset voltage of the Low Beam Pin PWM Input Voltage to zero. The diode D8 then corrects the offset voltage to be Vin minus the forward bias voltage of D8. The diode D9 then compensates for the diode D8 Forward Bias Voltage drop to raise the harmonic signal voltages above ground. C21 and C22 then operate to rectify the signal that is clamped by the Zener Diode ZD2 to limit the input voltage to Q5 to the clamping voltage of the Zener diode ZD2. R24 also functions with the Zener Diode ZD2 to conduct the voltage that is greater than the ZD2 clamping voltage. When the rectified input voltage at C21 is greater than the Zener Diode ZD2 clamping voltage the voltage to Q5 will be constant due to ZD2. If the rectified input voltage at C21 falls below the Zener Diode ZD2 clamping voltage then R24 and R25 form a voltage divider that inputs 91% of the rectified input voltage at C21.

The system uses the LED Driver Integrated Circuits IC1 and IC2 dimming pins as on/off switches.

Automotive industry headlight PWM Input Voltages are typically well above 14 Hz. If the frequency is below 14 Hz it will in practice be a DC Input Voltage which will operate as already described. This assures that there will not be cases where the Low Beam Pin PWM Input Voltage is of a low enough frequency to falsely trigger Q5 or Q8 by being at or near their forward bias Voltages.

Low Beam and DRL LED Driver and Application Circuit:

Once selected by the PWM Detection Output and Switching Circuit the respective LED Driver and Application circuit drives its respective LEDs to either energize the Low Beam or the DRL Beam LEDs.

Figure 6:
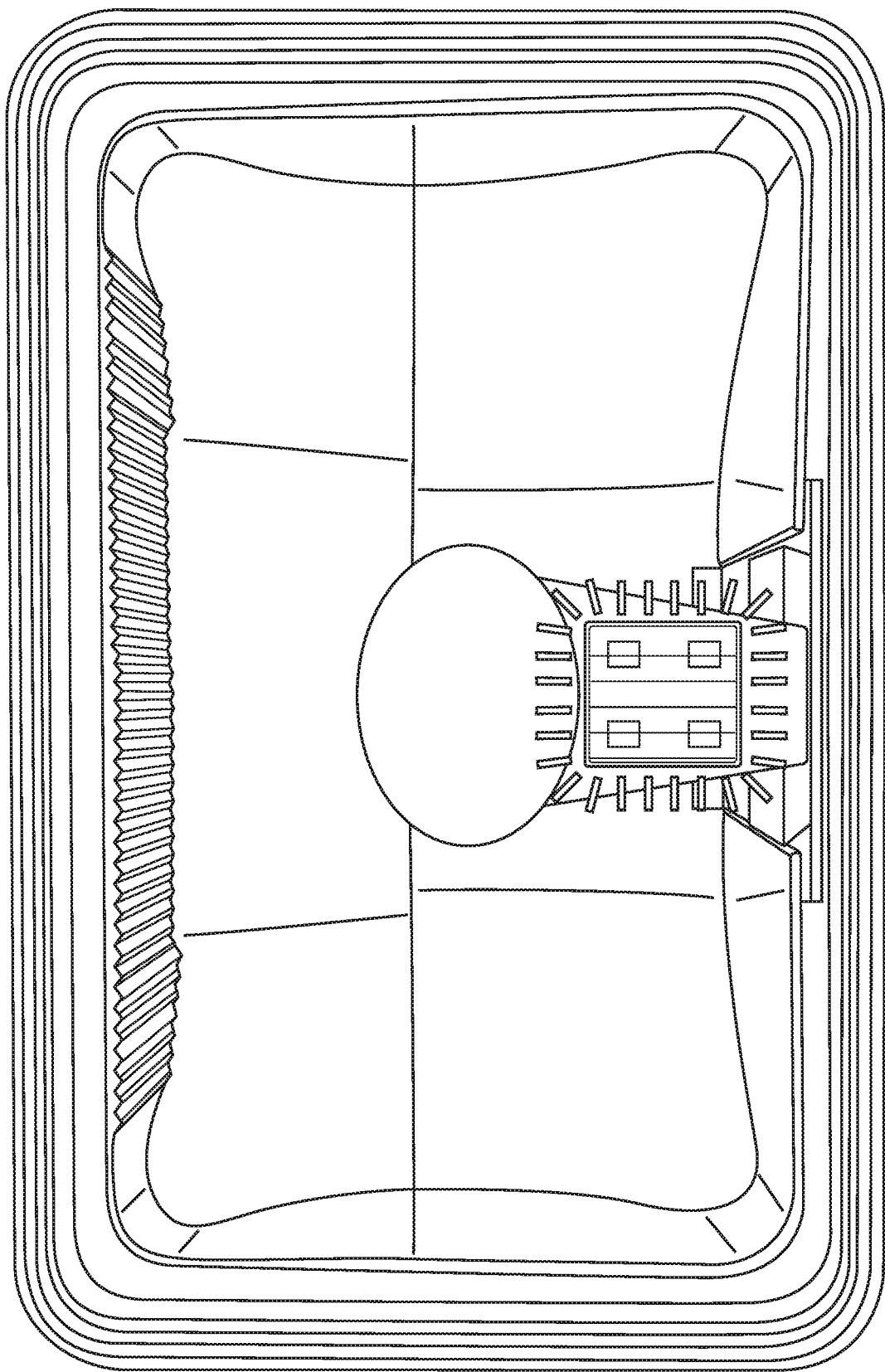
FIG. 6 shows a front view of the Low Beam/DRL headlamp of FIG. 3A, wherein a dynamic input voltage is applied to activate the DRL Beam LED output.

FIG. 6 shows a front view of the Low Beam/DRL headlamp of FIG. 3A, wherein a dynamic input voltage is applied to activate the DRL Beam LED output. DRL LEDs on the front face of the DRL component light up behind the textured lens to provide daytime running light inside the headlamp chamber, directed forward as shown.

Figure 7:
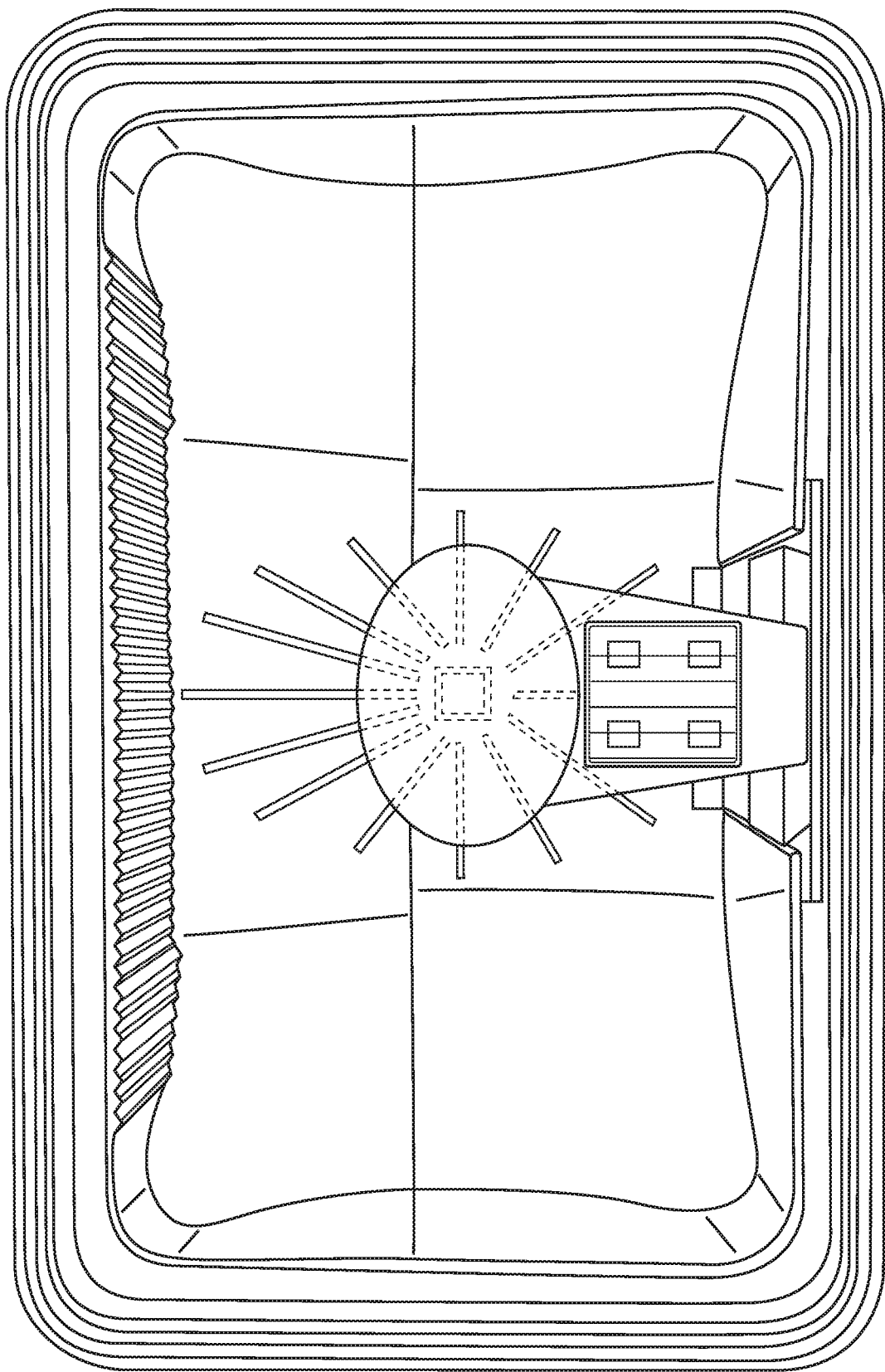
FIG. 7 shows a front view of the Low Beam/DRL headlamp of FIG. 3A, wherein a steady state input voltage is applied to activate the Low Beam LED output.

FIG. 7 shows a front view of the Low Beam/DRL headlamp of FIG. 3A, wherein a steady state input voltage is applied to activate the Low Beam LED output. With reference to FIG. 1B, low beam LED 140 on the back face of the DRL component is lighted to provide low beam light directed toward the reflective back wall of the headlamp chamber.

In some embodiments, the DRL component is part of a triple beam headlamp that provides a DRL function, a low beam headlamp function, and a high beam headlamp function. In some embodiments, the triple beam headlamp device comprises a 7" round or a 5"×7" rectangular integrated triple beam head light. The 7" round head light has a 7" diameter. The 5"×7" rectangular head light has dimensions of approximately 7.9"×5.6", in some embodiments. Each device has two sections. The Low Beam mode illuminates one section (Low Beam LEDs on) and the High Beam mode illuminates both sections (Low Beam and High Beam LEDs on). In various embodiments, the triple beam device includes one or more of the following features: Nine (9) LEDs, Auto Select 12/24 VDC Dual Voltage, Polycarbonate Lens with Hard Coating Shell, Standard 3 Blade OEM Connector. The Low Beam LEDs are selected and configured to output a light pattern to meet U.S. Department of Transportation Low Beam Requirements, the High Beam LEDs are selected and configured to output a light pattern to meet U.S. Department of Transportation High Beam Requirements, and the DRL LEDs are selected and configured to output a light pattern to meet U.S. Department of Transportation DRL Requirements. Different numbers, arrangements, and types of LEDs may be used for each lighting function, which meet these requirements.

In some embodiments, the triple beam headlamp is part of a two lamp system comprising two triple beam headlamps. In some embodiments, the triple beam headlamps have power connectors comprising three contacts, a Low Beam contact, a High Beam contact, and a Ground. In some embodiments, the three contacts comprise three pins/blades. In some embodiments, each triple beam headlamp has a three-pin connector having a Low Beam pin, a High Beam pin, and a Ground. If a PWM Signal is input on the Low Beam pin then the DRL Beam is energized within the headlamp. If the Low Beam has a steady state voltage the Low Beam is energized within the headlamp. If the High Beam has a steady state voltage the Low Beam and the High Beam are energized within the headlamp.

When started, vehicles equipped with the two lamp system described above output a PWM signal to the two triple beam headlamps' Low Beam pins. When the vehicle operator switches on the Low Beam via a first vehicle switch then the vehicle applies a steady state voltage to the two triple beam headlamps' Low Beam pins. When the vehicle operator switches on the High Beam via a second vehicle switch then the vehicle applies a steady state voltage to the two triple beam headlamps' High Beam pins.

While there have been shown and described fundamental novel features of the invention as applied to the preferred and exemplary embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

What is claimed is:

1. A triple beam headlamp, comprising a combination low beam/DRL component mounted inside a headlamp chamber having a reflective inner back wall, and a high beam lamp configured and arranged to output high beam head light when the high beam is selectively turned on, the low beam/DRL component comprising: a three-contact connector having a low beam contact, a high beam contact, and a ground; and a control circuit configured to monitor input voltage on the low beam contact, wherein said input voltage is used to determine a mode of operation of the headlamp, a dynamic input voltage driving a DRL mode of operation and a steady state input voltage driving a low beam mode of operation, and wherein said input voltage is also used to power the headlamp, without direct connection to the vehicle's battery.

2. The triple beam headlamp of claim 1, wherein the power connector comprises a three-pin connector comprising a low beam pin, a high beam pin, and a ground.

3. The triple beam headlamp of claim 1, configured to be mounted to at least one of a commercial truck and a recreational vehicle (RV).

4. The triple beam headlamp of claim 1, wherein the high beam lamp is configured to be energized with steady state voltage when the high beam is selectively turned on and the vehicle applies a steady state voltage to the high beam contact of the low beam/DRL component.

5. A two lamp head light system, wherein each lamp is a triple beam headlamp according to claim 1.

6. A combination low beam/DRL headlamp, comprising a three-contact connector having a low beam contact, a high beam contact, and a ground; and a control circuit configured to monitor input voltage on the low beam contact, wherein said input voltage is used to determine a mode of operation of the headlamp, a dynamic input voltage driving a DRL mode of operation and a steady state input voltage driving a low beam mode of operation, and wherein said input voltage is also used to power the headlamp, without direct connection to the vehicle's battery.

7. The low beam/DRL headlamp of claim 6, wherein the power connector comprises a three-pin connector comprising a low beam pin, a high beam pin, and a ground.

8. The low beam/DRL headlamp of claim 6, configured to be mounted to at least one of a commercial truck and a recreational vehicle (RV).

9. The low beam/DRL headlamp of claim 6, wherein the headlamp comprises one or more DRL LEDs configured and arranged specifically for DRL functionality.

10. The low beam/DRL headlamp of claim 9, wherein the headlamp comprises four DRL LEDs.

11. The low beam/DRL headlamp of claim 6, wherein the headlamp comprises one or more low beam LEDs configured and arranged to output low beam head light.

12. The low beam/DRL headlamp of claim 11, wherein the headlamp comprises at least one low beam LED comprising a multi-die LED.

* * * * *